United States Patent
Choi

(10) Patent No.: US 7,651,127 B2
(45) Date of Patent: Jan. 26, 2010

(54) BLASTING CAP APPARATUS FOR VEHICLE AIRBAG AND CONTROL METHOD

(75) Inventor: Kee Hyun Choi, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 333 days.

(21) Appl. No.: 11/648,817

(22) Filed: Dec. 28, 2006

(65) Prior Publication Data

US 2008/0100047 A1    May 1, 2008

(30) Foreign Application Priority Data

Oct. 31, 2006   (KR)   .................... 10-2006-0106445

(51) Int. Cl.
*B60R 21/16* (2006.01)
(52) U.S. Cl. .................................... 280/735
(58) Field of Classification Search ............. 280/735
See application file for complete search history.

(56) References Cited

U.S. PATENT DOCUMENTS

| 3,741,584 | A | * | 6/1973 | Arai ........................ 280/735 |
| 3,868,126 | A | * | 2/1975 | Radke et al. ............. 280/735 |
| 3,874,695 | A | * | 4/1975 | Abe et al. ................. 280/735 |
| 3,985,375 | A | * | 10/1976 | Lewis et al. ............ 280/737 |
| 4,243,248 | A | * | 1/1981 | Scholz et al. ........... 280/735 |
| 5,074,583 | A | * | 12/1991 | Fujita et al. ........... 280/730.1 |
| 5,209,510 | A | * | 5/1993 | Mamiya ................... 280/732 |
| 5,999,871 | A | * | 12/1999 | Liu .............................. 701/45 |
| 6,199,900 | B1 | * | 3/2001 | Zeigler ..................... 280/735 |
| 6,623,033 | B2 | * | 9/2003 | Breed ....................... 280/735 |
| 6,733,036 | B2 | * | 5/2004 | Breed et al. .............. 280/735 |
| 6,955,240 | B2 | | 10/2005 | Ahn et al. |
| 2007/0100527 | A1 | * | 5/2007 | Rao et al. ................... 701/45 |

FOREIGN PATENT DOCUMENTS

| JP | 03-279056 | 12/1991 |
| JP | 04-039142 | 2/1992 |
| JP | 10-059130 | 3/1998 |
| JP | 2002-234414 | 8/2002 |
| JP | 2005-155968 | 6/2005 |
| KR | 1020040079712 | 9/2004 |

* cited by examiner

*Primary Examiner*—Paul N Dickson
*Assistant Examiner*—Nicole Verley
(74) *Attorney, Agent, or Firm*—Morgan, Lewis & Bockius LLP

(57) ABSTRACT

A complex blasting cap apparatus of an airbag for a vehicle includes: a detector detecting impact acting on a vehicle body during a vehicle accident; a controller receiving a signal detected by the detector, computing the received signal, and applying different voltages so as to operate an inflator depending on a pre-input impact force; and a complex blasting cap formed as integration of a first blasting cap which is operated by a control signal of the controller and is exploded by a first voltage signal applied from the controller and a second blasting cap which is connected to a circuit to which the first blasting cap is connected and is exploded by a second voltage signal applied from the controller.

10 Claims, 5 Drawing Sheets

BLASTING CAP APPARATUS FOR VEHICLE AIRBAG AND CONTROL METHOD

CROSS-REFERENCE TO RELATED APPLICATION

This application claims priority to and the benefit of Korean Patent Application No. 10-2006-0106445 filed in the Korean Intellectual Property Office on Oct. 31, 2006, the entire contents of which are incorporated herein by reference.

BACKGROUND OF THE INVENTION (a) Field of the Invention

The present invention relates to a blasting cap apparatus of an airbag for a vehicle and a control method thereof.

(b) Description of the Related Art

Generally, a vehicle may be provided with an airbag module for protecting a driver or a passenger, and the airbag module includes a blasting cap for operating an inflator. An airbag module may include several independent blasting caps, so related circuit become complicated and manufacturing costs are increased. A driver airbag which is installed in a steering wheel may be complicated by an increase of the number of circuits increasing manufacturing costs.

SUMMARY OF THE INVENTION

An exemplary embodiment of the present invention provides a complex blasting cap apparatus of an airbag for a vehicle including: a detector detecting impact acting on a vehicle body during a vehicle accident; a controller receiving a signal detected by the detector, computing the received signal, and applying different voltages so as to operate an inflator depending on a pre-input impact force; and a complex blasting cap formed as integration of a first blasting cap which is operated by a control signal of the controller and is exploded by a first voltage signal applied from the controller and a second blasting cap which is connected to a circuit to which the first blasting cap is connected and is exploded by a second voltage signal applied from the controller.

The complex blasting cap may include a zener diode connected to the first blasting cap and the second blasting cap.

The first blasting cap and the second blasting cap of the complex blasting cap may be connected to one another in parallel.

The complex blasting cap may be configured such that the second blasting cap is positioned at a front of the first blasting cap.

The zener diode may have a voltage limit of 10V.

The first voltage signal applied by the controller may be a voltage signal of 12V and the second voltage signal is a voltage signal of 24V.

The controller may control to apply a first voltage signal to the complex blasting cap so as to explode the first blasting cap, to apply a second voltage signal to the complex blasting cap so as to explode the first blasting cap and the second blasting cap, or to apply the first voltage signal to the complex blasting cap and then to apply the second voltage signal so as to sequentially explode the first blasting cap and the second blasting cap.

In an exemplary embodiment of the present invention, a control method of a complex blasting cap apparatus of an airbag for a vehicle includes: detecting impact force acting on a vehicle body in a state that a driver seat or a front passenger seat is occupied by an occupant; and comparing the detected impact force to a predetermined impact value, and operating a first blasting cap, sequentially operating the first blasting cap and a second blasting cap, or simultaneously operating the first blasting cap and the second blasting cap, on the basis of the comparison.

The detecting impact force may include a first impact step where the predetermined impact value is set for the case that impact caused by a vehicle crash at a speed less than a speed of 14 mph acts, a second impact step where impacts successively act on a vehicle body, and a third impact step where the predetermined impact value is set for the case that impact caused by a vehicle crash at a speed higher than a speed of 20 mph acts.

In the case of the first impact step, electric power may be applied only to the first blasting cap so as to explode the first blasting cap.

In the case of the second impact step, electric power may be firstly applied to the first blasting cap and is then applied to the second blasting cap so as to explode the first blasting cap and the second blasting cap.

In the case of the third impact step, electric power may be simultaneously applied to the first blasting cap and the second blasting cap so as to explode the first blasting cap and the second blasting cap.

DETAILED DESCRIPTION OF THE EMBODIMENTS

An exemplary embodiment of the present invention will hereinafter be described in detail with reference to the accompanying drawings.

Figure 1A:
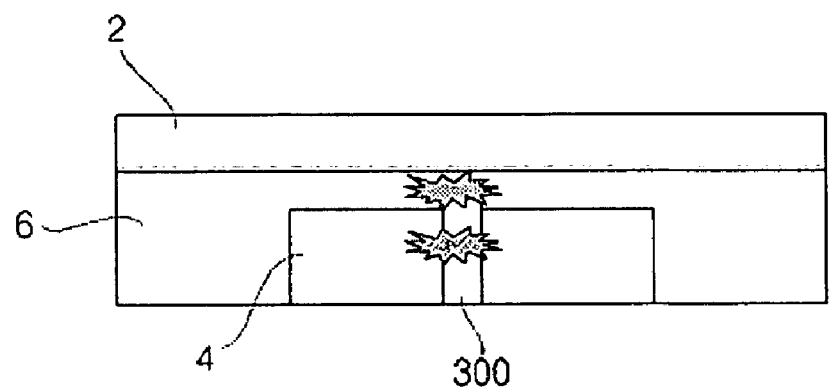
FIG. 1 is a diagram of an exemplary blasting cap apparatus of an airbag for a vehicle.
Figure 1B:
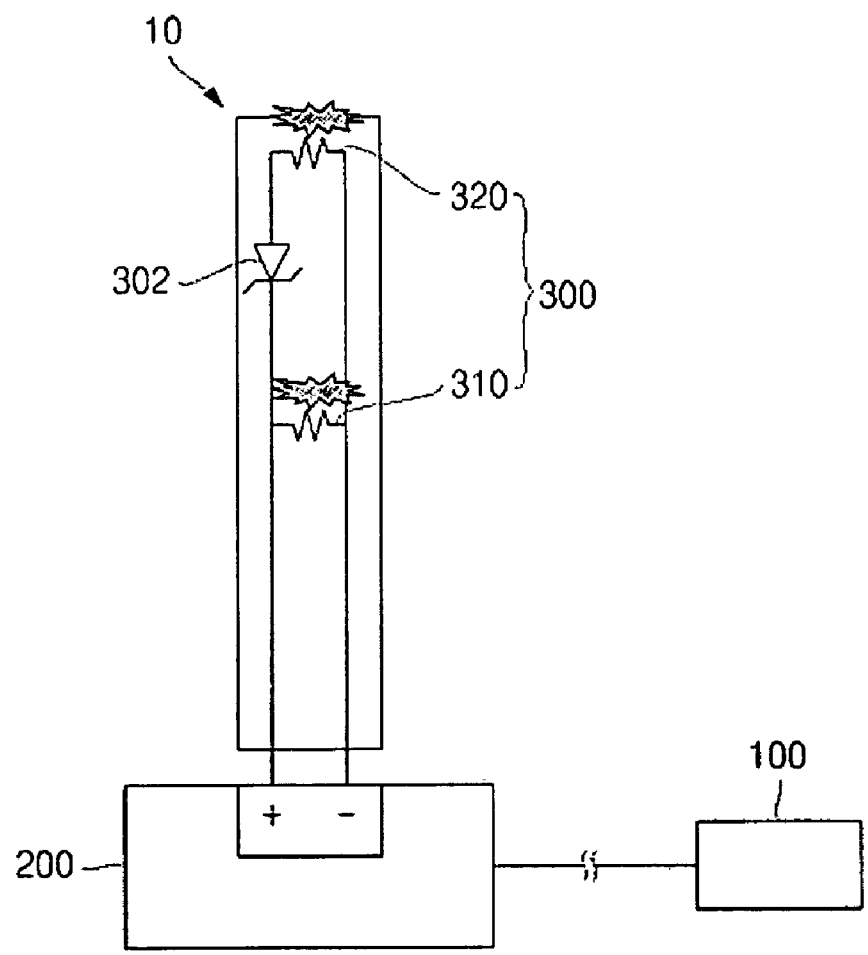
Figure 2A:
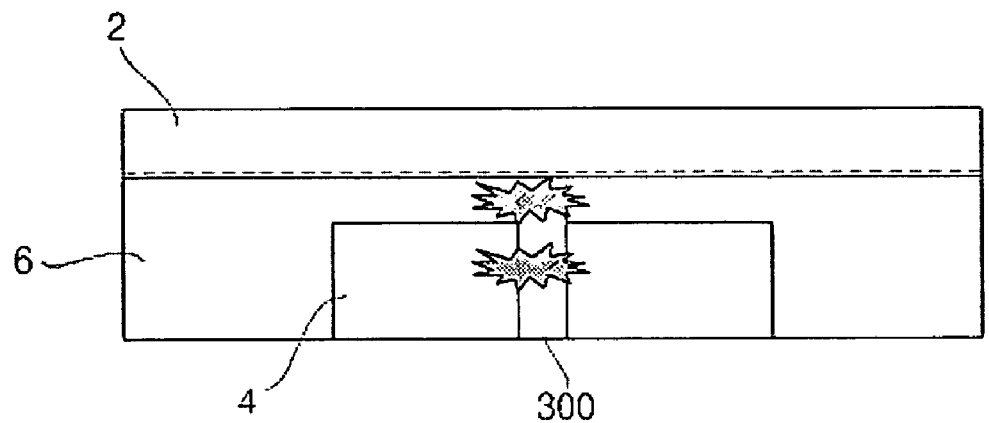
FIG. 2A and FIG. 2B are drawings showing exemplary operation states of a complex blasting cap apparatus of FIG. 1.
Figure 2B:
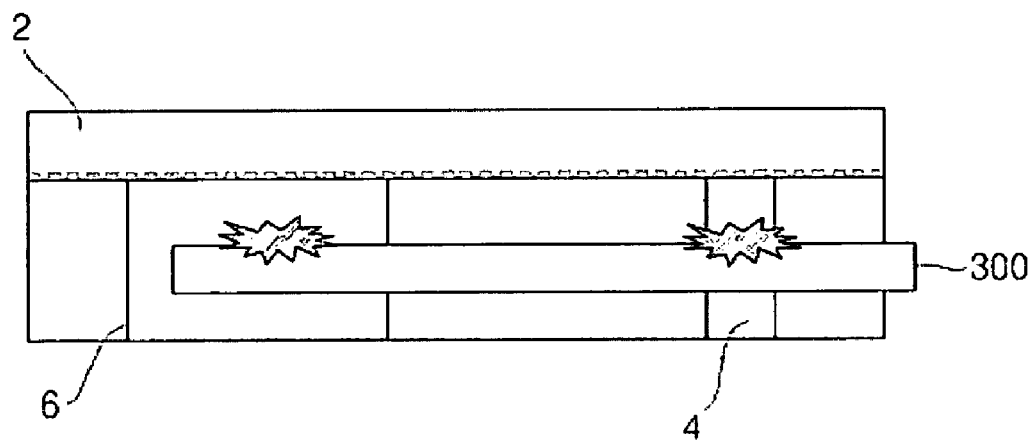
Figure 3:
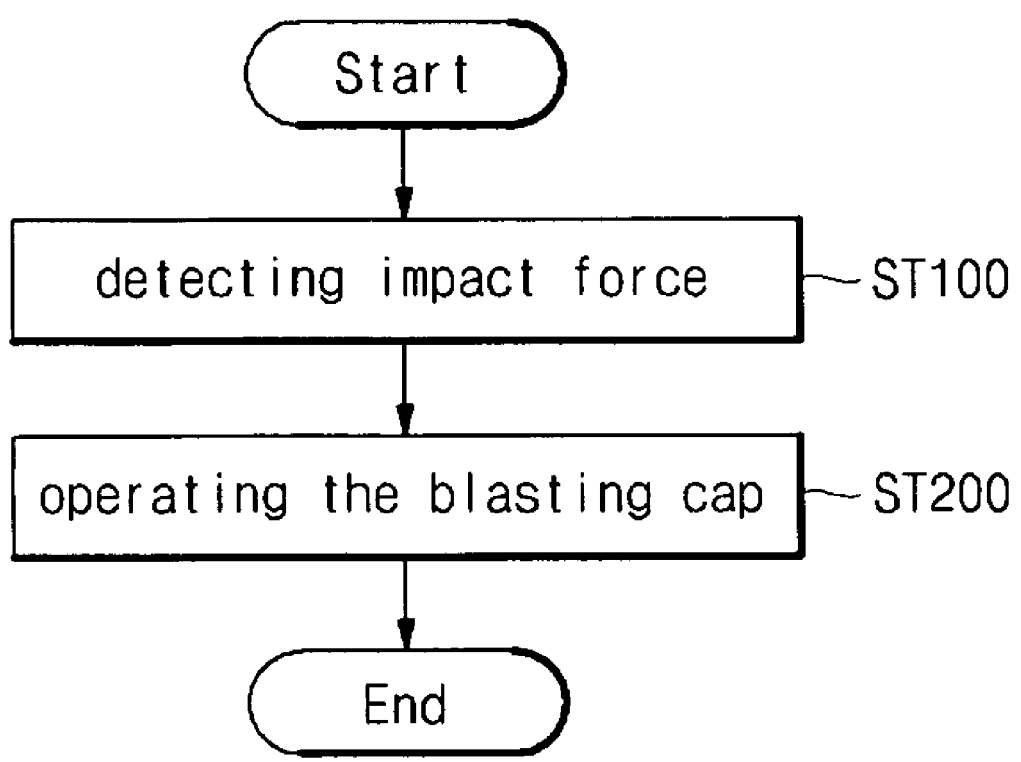
FIG. 3 is a flowchart of a control method of a complex blasting cap apparatus of the FIG. 1.
Figure 4:
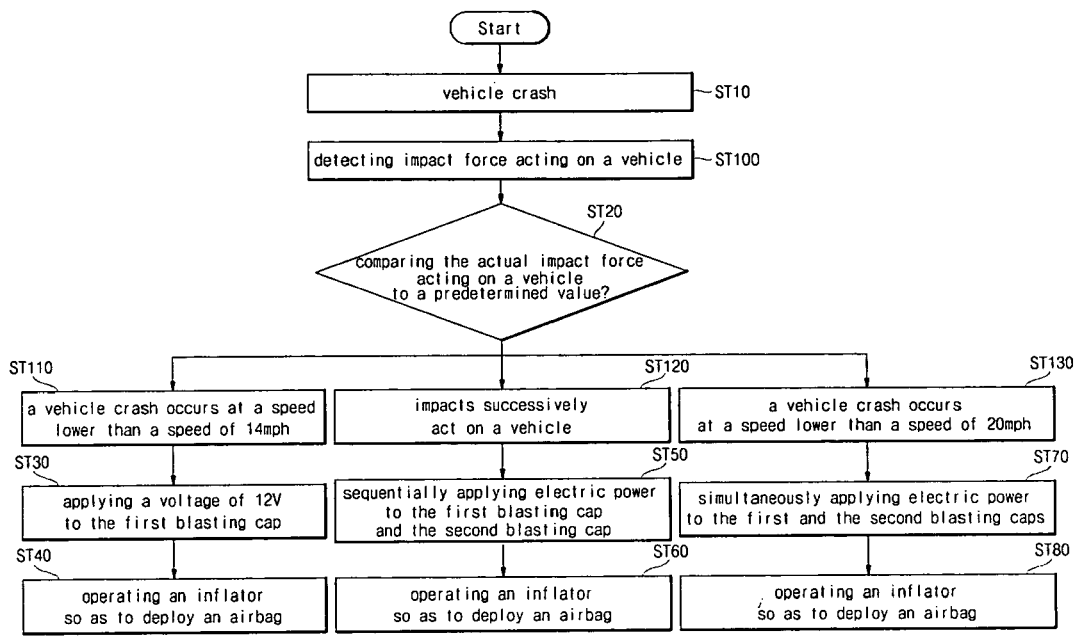
FIG. 4 is a flowchart showing operation states according to a control method of a complex blasting cap apparatus of FIG. 1.

Referring to FIGS. 1a and 1b a complex blasting cap apparatus 10 may include a detector 100, a controller 200, and a complex blasting cap 300. The detector 100 detects impact acting on a vehicle body during a vehicle accident and generates a corresponding signal. The controller 200 receives the signal of the detector 100, computes the received signal, and applies different voltages so as to operate an inflator 4, 6 depending on a pre-input impact force. The complex blasting cap 300 is formed as integration of a first blasting cap 310 and a second blasting cap 320. The first blasting cap 310 is operated by a control signal of the controller 200, and is exploded by a first voltage signal applied from the controller 200. The second blasting cap 320 is connected to a circuit to which the first blasting cap 310 is connected, and is exploded by a second voltage signal applied from the controller 200.

The complex blasting cap 300 may be configured such that a zener diode 302 is connected to the first blasting cap 310 and the second blasting cap 320. The complex blasting cap 300 is configured such that the first blasting cap 310 and the second blasting cap 320 are connected to one another in parallel. The complex blasting cap 300 is configured such that the second blasting cap 320 is disposed at the front of the first blasting cap 310.

The zener diode 302 may be installed so as to have a voltage limit of 10V.

In the exemplary embodiment shown in FIG. 1b, the blasting cap is configured such that the first voltage signal applied from the controller 200 is a 12V voltage signal and the second voltage signal is a 24V voltage signal.

The controller 200 is configured to apply the voltage signal to the complex blasting cap 300 so as to explode the first blasting cap 310, to apply the second voltage signal to the complex blasting cap 300 so as to explode the first and second blasting caps 310 and 320, or to apply the first voltage signal to the complex blasting cap 300 and then to apply the second voltage signal so as to sequentially explode the first and second blasting caps 310 and 320.

A control method of a complex blasting cap apparatus of an airbag for a vehicle according to an exemplary embodiment of the present invention includes: a step ST100 of detecting impact acting on a vehicle body in a state that a driver seat or a front passenger seat is occupied by an occupant; and a step ST200 of comparing the impact detected at step ST100 to a predetermined impact value, and operating the first blasting cap 310, sequentially operating the first and second blasting caps 310 and 320, or simultaneously operating the first and second blasting caps 310 and 320, on the basis of the comparison.

The step ST100 of detecting impact may include a first impact step ST110 where the predetermined impact value is set for the case that impact caused by a vehicle crash at a speed less than a speed of 14 mph acts, a second impact step ST120 where impacts successively act on a vehicle body, and a third impact step ST130 where the predetermined impact value is set for the case that impact caused by a vehicle crash at a speed higher than a speed of 20 mph acts.

The first impact step ST110 is configured to apply electric power only to the first blasting cap 310 so as to be exploded.

The second impact step ST120 is configured to firstly apply electric power to the first blasting cap 310 and then to supply electric power to the second blasting cap 320 so as to be exploded.

The third impact step ST130 is configured to simultaneously apply electric power to the first and second blasting caps 310 and 320 so as to be exploded.

Operation states of a complex blasting cap apparatus of an airbag for a vehicle according to an exemplary embodiment of the present invention and a control method thereof will be explained with reference to the drawings.

Referring to FIG. 1 to FIG. 4, if a vehicle crash occurs while a vehicle runs at step ST10, the detector 100 detects impact acting on a vehicle at step S100, and transmits a corresponding signal to the controller 200. The controller 200 receives the signal from the detector 100, computes the same, and compares the actual impact force value to the predetermined values at step ST20.

At the step ST110 where the predetermined impact value is set for the case that impact caused by a vehicle crash less than a speed of 14 mph acts, the complex blasting cap 300 operates as follows.

At the step ST110 in which a vehicle crash occurs at a speed less than 14 mph, the first voltage corresponding to 12V is applied to a circuit line by the controller 200 at step ST30 so as to explode the first blasting cap 310. An inflator 4 to which the first blasting cap 310 is installed is operated by the explosion of the first blasting cap 310, so an airbag 2 is deployed at step ST40, thereby protecting an occupant.

Voltage of 12V which has been applied to the first blasting cap 310 is directly applied to the first blasting cap 310 so as to cause explosion, but voltage of 2V is applied to the second blasting cap 320 by the operation of the zener diode 302 so that the second blasting cap 320 is not exploded because the zener diode 302 has a voltage limit of 10V.

Meanwhile, in the case that impacts successively act on a vehicle, operation is as follows.

If successive vehicle crashes occur while a vehicle runs at step ST120, the detector 100 detects impacts acting one a vehicle at step ST100, and transmits a corresponding signal to the controller 200. The controller 200 receives the signal from the detector 100, computes the same, and compares the actual impact force value to the predetermined values at step ST20.

The first voltage corresponding to 12V is applied to a circuit line by the controller 200 at step ST30 so as to explode the first blasting cap 310. Subsequently, the second voltage corresponding to 24V is applied at step ST50 so as to explode the second blasting cap 320.

Inflators 4 and 6 to which the first and second blasting caps 310 and 320 are installed are operated by explosions of the first blasting cap 310 and the second blasting cap 320, so the airbag 2 is deployed at step ST60, thereby protecting an occupant.

Voltage of 12V which has been applied to the first blasting cap 310 is directly applied to the first blasting cap 310 so as to cause explosion, and voltage of 24V which has been applied with time delay is changed to voltage of 14V by the zener diode 302 and the changed voltage is applied to the second blasting cap 320 so that the second blasting cap 320 is also be exploded.

If a vehicle crash occurs while a vehicle runs at a high speed, the complex blasting cap operates as follows.

If a vehicle crash occurs while a vehicle runs at a speed higher than 20 mph at step ST130, voltage of 24V are simultaneously applied to the first and second blasting caps 310 and 320 so that both the first and second blasting caps 310 and 320 are exploded.

The inflators 4 and 6 to which the first and second blasting caps 310 and 320 are installed are operated by explosions of the first blasting cap 310 and the second blasting cap 320, so the airbag 2 is deployed at step ST80, thereby protecting an occupant.

Voltage states applied by a control method of a complex blasting cap apparatus of an airbag for a vehicle according to an exemplary embodiment of the present invention will be explained with reference to FIG. 5.

Figure 5:
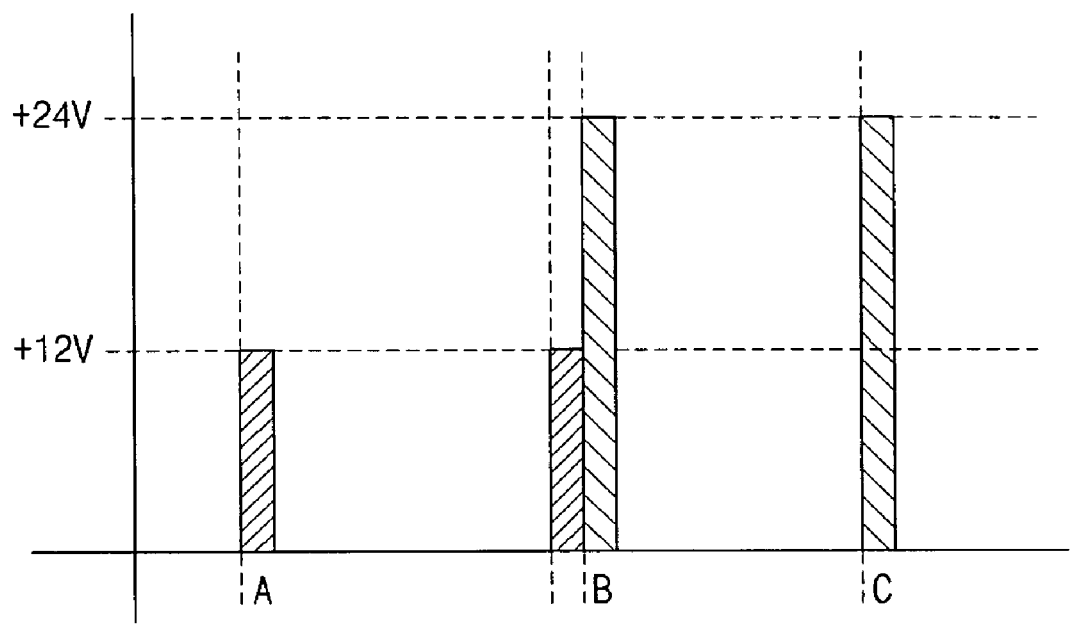
FIG. 5 is a graph showing exemplary voltage states according to a control method of a complex blasting cap apparatus of FIG. 1.

Referring to FIG. 5, the state A shows that electric power of 12V is applied only to the first blasting cap 310 according to the first impact step ST110 so as to operate the inflator.

The state B shows that electric powers of 12V and 24V are sequentially applied to the first blasting cap 310 and the second blasting cap 320 in the second impact step ST120 where successive impacts act on a vehicle body.

The state C shows that the second voltage signal corresponding to 24V is applied according to the third impact step ST130 so that electric power is simultaneously applied to the first and second blasting caps 310 and 320.

As described above, various operations occur depending on electric power signal applied to the first and second blasting caps 310 and 320.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, a complex blasting cap apparatus of an airbag for a vehicle according to an embodiment of the present invention and a control method thereof can simplify a complicated structure of a blasting cap which is installed to an inflator into a single blasting cap having complex function, thereby simplifying a vehicle body structure and structures of related parts.

Furthermore, the number of circuits connected to an airbag can be reduced, so that thickness of a wire that is prepared for exclusive use of an airbag can be reduced and the material cost can be reduced.

What is claimed is:

1. A control method for a blasting cap apparatus of a vehicle airbag, comprising:
   detecting an impact force on a vehicle body in a state that a driver seat or a front passenger seat is occupied by an occupant; and
   comparing the impact force to a predetermined value, and operating a first blasting cap, sequentially operating the first blasting cap and a second blasting cap, or simultaneously operating the first blasting cap and the second blasting cap based on different output signals by a comparison of the impact force and the predetermined value,
   wherein the different output signals are applied to the first blasting cap and/or the second blasting cap via a signal output of a controller which is connected to a detector detecting the impact force.

2. The control method of claim 1, wherein detecting the impact force comprises a first impact step where the predetermined impact value is set for the case that impact caused by a vehicle crash at a speed less than a speed of 14 mph acts, a second impact step where impacts successively act on a vehicle body, and a third impact step where the predetermined impact value is set for the case that impact caused by a vehicle crash at a speed higher than a speed of 20 mph acts.

3. The control method of claim 2, wherein in the case of the first impact step, electric power is applied only to the first blasting cap so as to explode the first blasting cap.

4. The control method of claim 2, wherein in the case of the second impact step, electric power is firstly applied to the first blasting cap and is then applied to the second blasting cap so as to explode the first blasting cap and the second blasting cap.

5. The control method of claim 2, wherein in the case of the third impact step, electric power is simultaneously applied to the first blasting cap and the second blasting cap so as to explode the first blasting cap and the second blasting cap.

6. A control method for a blasting cap apparatus of a vehicle airbag, comprising:
   providing (i) an impact force detector disposed in a vehicle such that the impact force detector measures impact forces acting on the vehicle and generates a measured impact force signal, (ii) a controller having an input and an single output, the input being in electrical communication with the impact force detector such that the controller receives the measured impact force signal from the impact force detector, computes the measured impact force signal, and applies an output signal to the single output of the controller based on the measured impact force signal, and (iii) a blasting cap that comprises, a first blasting cap in electrical communication with the single output of the controller such that the first blasting cap is activated by a first output signal applied by the controller to the single output of the controller, and a second blasting cap in electrical communication with the first blasting cap and the single output of the controller such that the second blasting cap is activated by a second output signal applied by the controller to the single output of the controller;
   detecting an impact force on a vehicle body in a state that a driver seat or a front passenger seat is occupied by an occupant; and
   comparing the impact force to a predetermined value, and operating the first blasting cap, sequentially operating the first blasting cap and the second blasting cap, or simultaneously operating the first blasting cap and the second blasting cap based on different output signals of the single output of the controller by a comparison of the impact force and the predetermined value.

7. The control method of claim 6, wherein detecting the impact force comprises a first impact step where the predetermined impact value is set for the case that impact caused by a vehicle crash at a speed less than a speed of 14 mph acts, a second impact step where impacts successively act on a vehicle body, and a third impact step where the predetermined impact value is set for the case that impact caused by a vehicle crash at a speed higher than a speed of 20 mph acts.

8. The control method of claim 7, wherein in the case of the first impact step, electric power is applied only to the first blasting cap so as to explode the first blasting cap.

9. The control method of claim 7, wherein in the case of the second impact step, electric power is firstly applied to the first blasting cap and is then applied to the second blasting cap so as to explode the first blasting cap and the second blasting cap.

10. The control method of claim 7, wherein in the case of the third impact step, electric power is simultaneously applied to the first blasting cap and the second blasting cap so as to explode the first blasting cap and the second blasting cap.

* * * * *